(12) United States Patent
Tomas Puchades

(10) Patent No.: US 10,384,655 B2
(45) Date of Patent: Aug. 20, 2019

(54) HEAD FOR WASHING VEHICLE WHEELS

(71) Applicant: ISTOBAL, S.A., La Alcudia (ES)

(72) Inventor: Yolanda Tomas Puchades, La Alcudia (ES)

(73) Assignee: ISTOBAL, S.A., La Alcudia (ES)

( * ) Notice: Subject to any disclaimer, the term of this patent is extended or adjusted under 35 U.S.C. 154(b) by 239 days.

(21) Appl. No.: 15/641,512

(22) Filed: Jul. 5, 2017

(65) Prior Publication Data

US 2019/0009755 A1     Jan. 10, 2019

(51) Int. Cl.
     *A46B 13/02*      (2006.01)
     *B60S 3/04*      (2006.01)
     *B60S 3/06*      (2006.01)
     *A46B 13/00*      (2006.01)

(52) U.S. Cl.
CPC ............ *B60S 3/042* (2013.01); *A46B 13/008* (2013.01); *A46B 13/02* (2013.01); *B60S 3/06* (2013.01); *A46B 2200/3046* (2013.01)

(58) Field of Classification Search
CPC .......... B60S 3/042; B60S 3/06; A46B 13/008; A46B 13/02
See application file for complete search history.

(56) References Cited

U.S. PATENT DOCUMENTS

| | | | | |
|---|---|---|---|---|
| 4,476,602 | A | * | 10/1984 | Hurn ...................... A46B 13/02 15/28 |
| 2003/0182743 | A1 | * | 10/2003 | Gatzemeyer ........... A46B 13/02 15/22.1 |
| 2013/0333127 | A1 | | 12/2013 | Langer et al. |
| 2015/0183407 | A1 | * | 7/2015 | Pak ......................... B60S 3/042 15/389 |
| 2017/0332850 | A1 | * | 11/2017 | Powell ................. A46B 5/0095 |

FOREIGN PATENT DOCUMENTS

DE      202009011186 U1    12/2010

* cited by examiner

*Primary Examiner* — Randall E Chin
(74) *Attorney, Agent, or Firm* — The Webb Law Firm

(57) ABSTRACT

It comprises a housing (1) wherein a ring-shaped brush (2) and a central axis (3) to which a central brush (4) is joined are integrally fastened. The ring-shaped brush (2) delimits an inner space wherein the central brush (4) as well as other intermediate brushes (5) arranged around the central brush are housed. The head further comprises a front disc (6) with idler rotation; wherein said front disc (6) separates two opposing areas: a first area where the central brush as well as the intermediate brushes are, and a second area where a transmission mechanism is located that transmits a rotational movement to the intermediate brushes fastened to satellite axes (12) fitted in tubular junctions (6a) secured to the front disc. It enables the correct cleaning of the inner surface of the gaps in the rims of the wheels.

9 Claims, 5 Drawing Sheets

SEC. A - A

HEAD FOR WASHING VEHICLE WHEELS

OBJECT OF THE INVENTION

The present invention, as expressed in the title of this specification, relates to a head for washing vehicle wheels that turns as driven by a motor element; wherein said head can be mounted in any vehicle-washing machine. The new head can substitute another mounted head without needing to handle it or couple any additional mechanisms as is done conventionally. Furthermore, the new head of the invention enables correct cleaning of the inner surface of the gaps in the rims of the wheels, the bristles of satellite (or secondary) brushes arranged around the central axis of the head being inserted, inside of said gaps in the rims; wherein said satellite brushes can be held in a static position (without revolution with respect to the axis of the head), but rotating on the axis thereof, when they are facing gaps in the rim of the wheels during the cleaning thereof.

TECHNICAL PROBLEM TO BE SOLVED AND BACKGROUND TO THE INVENTION

Currently, brushes for washing vehicle wheels are known that comprise a circular base wherein polyethylene bristles are fastened, making up a uniform body. This brush model is perfectly operational when the wheel of the vehicle that is to be washed incorporates a hubcap, said hubcap being flat and having a simple shape in most cases. Nevertheless, a drawback emerges when the brush is not able to access the different slots and gaps in the wheels that are on the market.

Moreover, on the market there are generally several types of brushes for cleaning the wheels of vehicles. Nevertheless, the operation of the majority of said brushes consists of making one or several brushes rotate that are secured to an axis actuated by a motor. Until now, all the brushes maintain a rotational rhythm set by the rotational speed of the motor.

Apart from the fact that some manufacturers have developed systems that are able to make more than one brush rotate independently, said brushes are always rhythmically rotating together around a common axis. This situation does not cause any of the brushes to stop in any position, so it is impossible for the bristles of the brushes to penetrate the gaps of the rims of the wheels because said brushes are always carried by the central axis.

The German utility model with publication no. DE 202009011186 U1 describes the operation of a wheel washing device that is made up of a main disc with a larger diameter that in turn contains three secondary discs with a smaller diameter, angularly equidistant to each other, wherein said secondary discs are endowed with rotational movement on the axis thereof, in addition to the revolution movement that they carry out with respect to the rotational axis of the main disc; wherein said main disc, in the rotating movement thereof, carries said secondary discs, endowing them with the revolution movement thereof.

This system incorporates three satellite brushes connected to the secondary discs and, as has been introduced, these secondary discs are endowed with their own rotational movement in addition to the revolution movement that they complete with respect to the axis of the main disc that contains them. Nevertheless, this system has the drawback that said revolution and rotational movements of the secondary discs are inextricably linked such that if the revolution movement of one of the secondary discs is stopped (by introducing said disc into one of the gaps of the rim), all the discs stop as well in their rotational movement with respect to the axes thereof. In other words, this system prevents any of the satellite brushes from staying in a static position in any of the gaps of the rim of the wheel and, as such, cleaning the inside of said gaps of the rim will be limited, or even nonexistent.

The patent with publication No. US 2013/0333127 A1 is also known which describes the operations of a wheel-washing apparatus that has three satellite brushes that carry out superimposed movements, each satellite brush rotating around its own axis and furthermore, said satellite brushes rotate around a common axis.

This described system, apart from being expensive and very sophisticated, does not guarantee that the satellite brushes with a smaller diameter can penetrate the gaps of some rims of the vehicle wheels for the same reason that was referred to previously, wherein it was described that the secondary brushes do not stop at any time upon being conjointly carried by the common axis.

In addition to the explained limitations and disadvantages of the two systems described in the cited documents, it is worth noting that said systems depend on a complete mechanism. This means that in order to substitute one of these wheel-washing devices in any pre-installed machine, it is necessary to mount the assembly of the system instead of substituting only a head such as the one described by the invention.

DESCRIPTION OF THE INVENTION

With the object of reaching the objectives and preventing the disadvantages mentioned in the previous sections, the invention proposes a head for washing vehicle wheels that comprises a housing wherein a ring-shaped brush and a central axis to which a central brush is joined are integrally fastened. Said ring-shaped brush delimits an inner space wherein the central brush as well as intermediate brushes arranged around the central brush are housed. In an embodiment, the housing has a circular shape.

The head of the invention further comprises a front disc coupled with idler rotation around the central axis; wherein said front disc is located inside the inner space delimited by the ring-shaped brush.

The front disc separates two opposing areas: a first area where the central brush as well as the intermediate brushes are located, and a second area where a transmission mechanism is located that transmits rotational movement to the intermediate brushes fastened to satellite axes fitted in tubular junctions secured to the front disc. During the rotation of the head, the intermediate brushes maintain the rotation thereof in static positions when they are facing gaps in a rim of the vehicle wheel to be washed.

The front disc, by means of the coupling configuration thereof in idler rotation around the central axis, thus enables the intermediate brushes (or satellite brushes) to rotate freely with respect to the central axis (in other words, without needing to be necessarily subjected to a forced revolution movement around the central axis, imposed by the rotation of said central axis).

The transmission mechanism that transmits rotational movement to the intermediate brushes comprises a driving cogwheel secured to the central axis, intermediate cogwheels and driven cogwheels; wherein the intermediate cogwheels interlock with the driving cogwheel and with the driven cogwheels; and wherein the transmission of movement to the intermediate brushes is carried out independently.

The intermediate brushes are arranged in at least one concentric circumferential alignment with respect to the central axis, even though they are preferably arranged in at least two different concentric circumferential alignments using the central axis as a reference. Thus, upon being at different distances with respect to the center of the head, all the gaps of the rim can be accessed regardless of where they are located on the rim of the wheel.

Each of the intermediate cogwheels interlocks with the driving cogwheel and with two driven cogwheels that transmit the rotational movement to two intermediate brushes situated in different concentric alignments.

The central axis is joined to the housing by means of a tubular junction end secured to the central axis; wherein said tubular junction end is joined to a detachable front disc that makes up part of said tubular housing. Between the detachable front disc and the front disc, a chamber is created wherein the transmission mechanism that transmits the rotational movement to the intermediate brushes is housed.

The transmission of the rotation from the driving cogwheel to the driven cogwheels is a transmission that increases the number of revolutions. In one embodiment, the intermediate cogwheels have a larger diameter than the driving cogwheel and the driven cogwheels have a smaller diameter than the driving cogwheel.

For the purpose of helping to make this specification more readily understandable, a set of drawings constituting an integral part of the same has been included below, wherein by way of illustration and not limitation the object of the invention has been represented.

DESCRIPTION OF AN EXEMPLARY EMBODIMENT OF THE INVENTION

Figure 1:
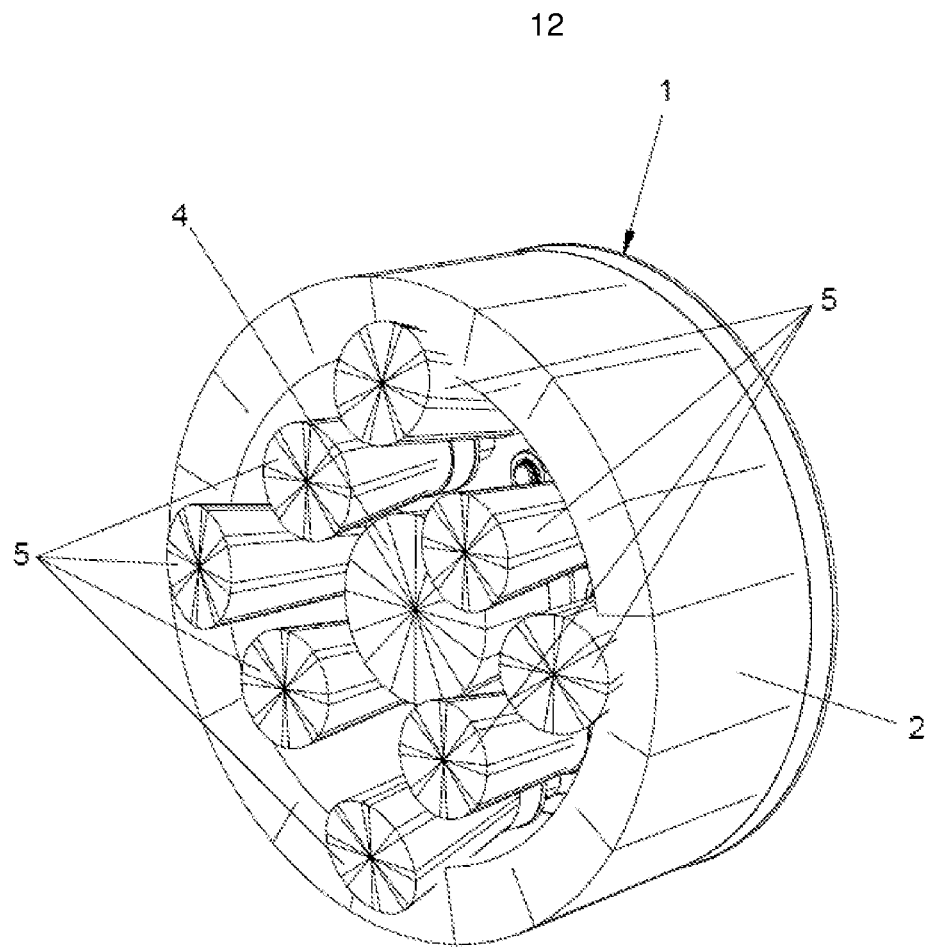
FIG. 1 shows a perspective view of a head for washing vehicle wheels, object of the invention.
Figure 2:
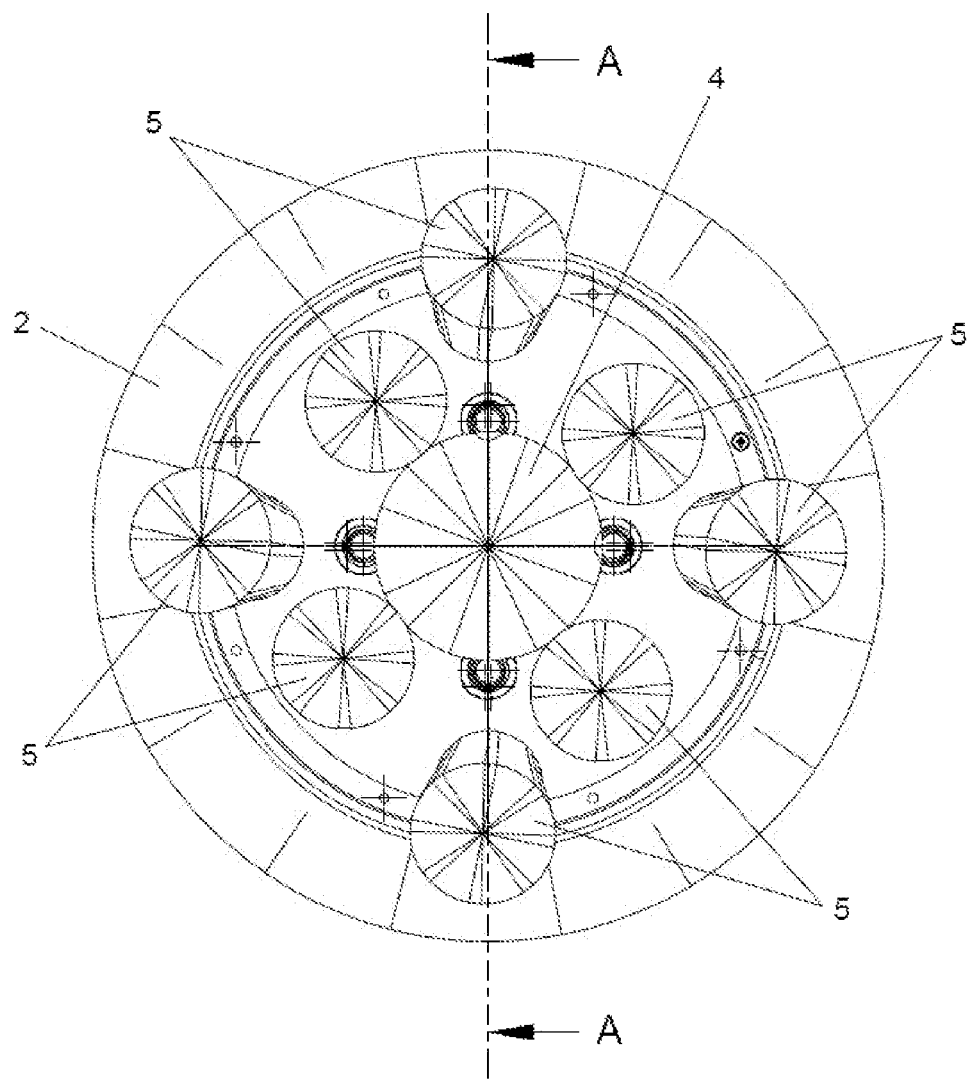
FIG. 2 shows a front view of the head of the invention.
Figure 3:
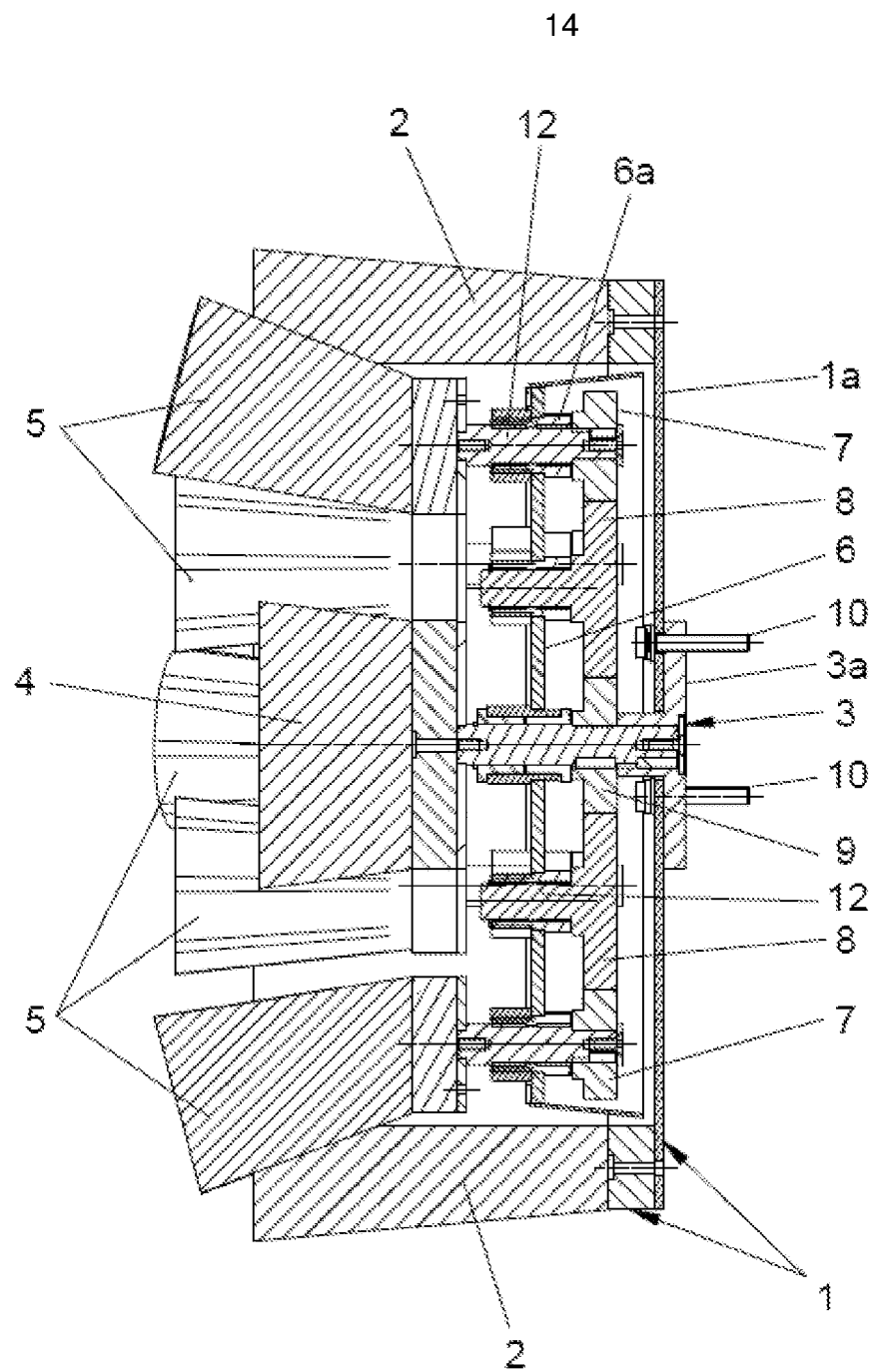
FIG. 3 shows a cross-section view according to the A-A cut of FIG. 2.
Figure 4:
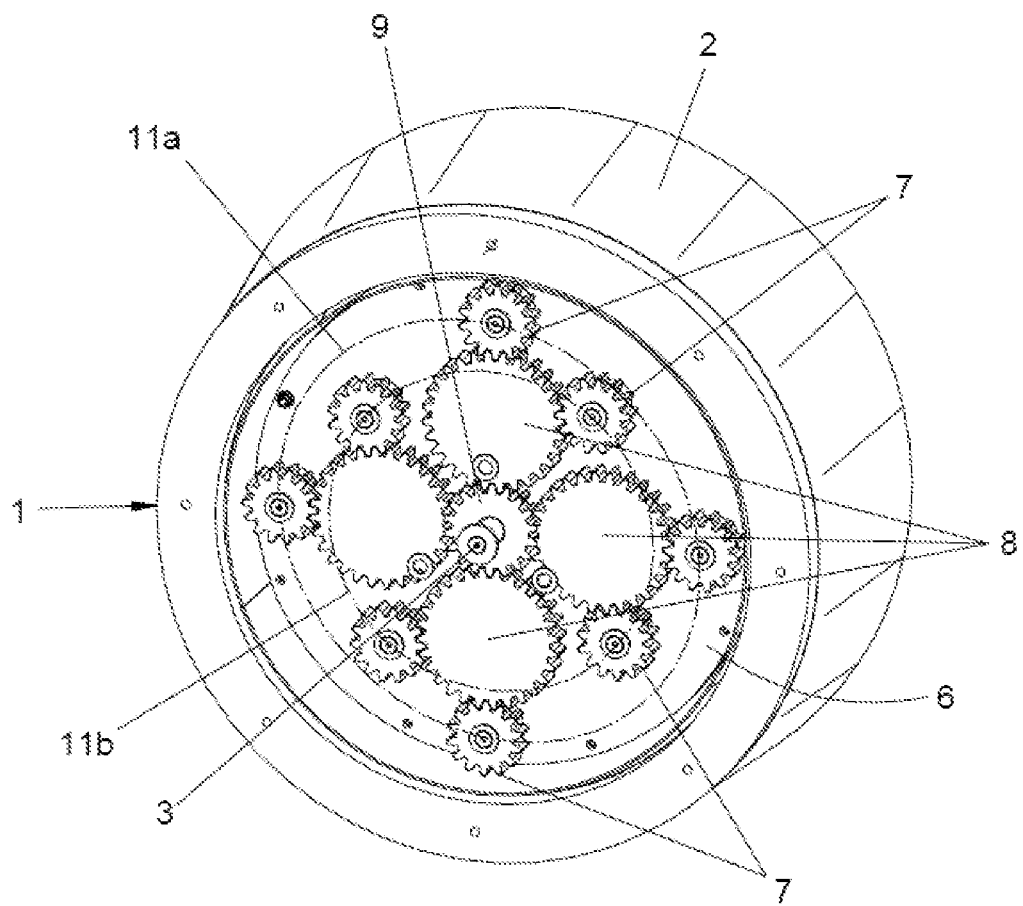
FIG. 4 shows a perspective view of the head of the invention, wherein a movement transmission mechanism is essentially shown.
Figure 5:
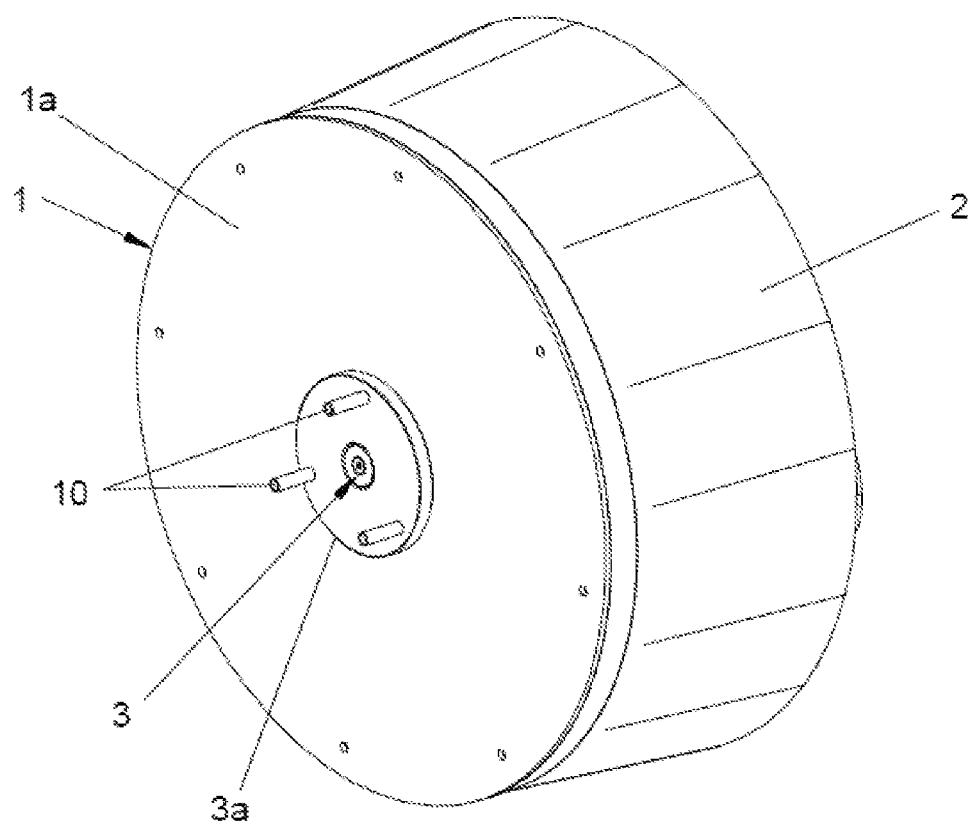
FIG. 5 shows another perspective view of the head of the invention.

Considering the numbering adopted in the figures, the head for washing vehicle wheels comprises a circular housing 1 wherein a ring-shaped brush 2 and a central axis 3 that carries a central brush 4 are fastened.

The ring-shaped brush 2 delimits an inner space that houses the central brush 4 and also other intermediate brushes 5 arranged in two different concentric circumferential alignments 11a, 11b around the central brush 4.

On the central axis 3 a front disc 6 is coupled with free rotation, which is also located inside the inner space delimited by the ring-shaped brush 2; wherein said front disc 6 has tubular junctions 6a wherein satellite axes 12 are fitted and have first ends in which the intermediate brushes 5 are fastened, and second ends opposite of the first ends, in which driven cogwheels 7 fit, which interlock with other intermediate cogwheels 8 and these interlock in turn with a driving centered wheel 9 integrally embedded in the central axis 3.

The front disc 6 separates two opposing areas: a first area wherein the central brush 4 and also the intermediate brushes 5 are located, and a second area wherein the driven cogwheels 7, intermediate cogwheels 8 and intermediate centered wheels 8 are located.

The central axis 3 is secured to a tubular junction end 3a that is fastened to a front detachable lid 1a that makes up part of the housing 1 in which screws 10 are installed that are also used to fasten the assembly of the head to a washing machine.

In the embodiment shown in the figures, each intermediate cogwheel 8 interlocks with two driven cogwheels 7: one that transmits the movement to an intermediate brush 5 located in a concentric circumferential alignment 11a and another cogwheel 7 that transmits the movement to another intermediate brush 5 located in another concentric circumferential alignment 11b.

In order to clean the rims of the wheels of a vehicle, the central axis 3 causes the central brush 4 and the ring-shaped brush 2 to rotate. On the central axis 3, the front disc 6 rotates freely in which the satellite axes 12 are coupled, distributed in the two concentric circumferential alignments 11a, 11b.

With this described arrangement, the cleaning of front gaps of the rims of vehicle wheels is completed by means of the intermediate brushes 5 strategically arranged in the two concentric circumferential alignments 11a, 11b, such that with this distribution better coverage of the whole wheel is achieved. It is worth noting that although the embodiment shown in the figures has intermediate brushes 5 distributed in two concentric circumferential alignments, they could also be arranged in more than two and even in one single concentric circumferential alignment.

Thus, when the rotation of the central axis 3 is actuated, it carries the housing 1 together with the ring-shaped brush 2 and central brush 4 in the movement thereof, at the same time that it carries the front disc 6 by inertia. In this situation, while there is no contact, apparently, the assembly of the head will behave as a conventional head. While the intermediate brushes 5 are not introduced into the gaps of the rims and do not find any obstacles, the effort that the central axis 3 needs to expend in order to cause a revolution movement in the satellite axes 12 mounted in the front disc 6 is less than the effort that said central axis 3 would need to make in order to make the transmission mechanism rotate completely. Therefore, as long as no obstacle exists for the revolution movement of the intermediate brushes 5, they will substantially continue a pure revolution movement around the central axis 3, and practically without rotation on the satellite axes 12 thereof.

In contrast, when the intermediate brushes 5 detect friction with the rim they brake the front disc 6 and the rotating movement transmission mechanism causes the independent rotation of each of the intermediate brushes 5, while the central brush 4 and the ring-shaped brush 2 continue rotating normally without stopping. This is achieved with the driving cogwheel 9 that transmits the rotational movement to the satellite axes 12.

The transmission of rotation from the driving cogwheel 9 to the satellite axes 12 wherein the intermediate brushes 5 are fastened is achieved by means of the intermediate cogwheels 8 that have a larger diameter than the driving cogwheel 9, in order to free it from unnecessary effort. In turn, the driven cogwheels 7 have a smaller diameter than the driving cogwheel 9 with the goal of subtly increasing the rotational speed of the intermediate brushes 5 with respect to the ring-shaped brush 2 and the central brush 4.

As pressure is exerted with the bristles of the brushes on the rim of the wheel of the vehicle, the intermediate brushes 5 start to penetrate the gaps in the rim. Moreover, when the ring-shaped brush 2 and the central brush 4 reach the rim of the wheel of the vehicle, they cause the front disc 6 to be slightly freed from the pressure, causing said front disc 6 to rotate little by little and advances the position of the intermediate brushes 5, in this way diminishing the rotational speed of the intermediate brushes 5 and at the same time allowing them to rotate with the same revolutions as the central brush 4 and the ring-shaped brush 2.

The invention claimed is:

1. A head for washing vehicle wheels, comprising:
   a housing (1), comprising a ring-shaped brush (2) and a central axis portion (3) to which a central brush (4) is fastened; wherein the ring-shaped brush (2) delimits an inner space that houses the central brush (4), and wherein a plurality of intermediate brushes (5) are arranged around the central brush (4);
   a front disc (6) coupled around the central axis (3) to allow free rotation; wherein said front disc (6) is located inside the inner space delimited by the ring-shaped brush (2); and wherein said front disc (6) separates two opposing areas: a first area wherein at least the central brush (4) and the plurality of intermediate brushes (5) are located, and a second area wherein a transmission mechanism is located that is configured for transmitting a rotating revolution movement to the intermediate brushes (5) around the central axis portion (3) and a rotating rotational movement to the intermediate brushes (5) around their own satellite axes (12);
   wherein the transmission mechanism comprises a driving centered wheel (9) integrally embedded in the central axis portion (3) and driven cogwheels (7) in which second ends of the satellite axes (12) are embedded;
   wherein the intermediate brushes (5) are fastened to first ends of the satellite axes (12);
   wherein the satellite axes (12) are housed in tubular joints (6a) secured to the front disc (6) and allowed to freely rotate; and
   wherein the head is configured so that, if the plurality of intermediate brushes (5) are rotationally obstructed about the central brush (4), the transmission mechanism transmits the rotating movement of rotation to the plurality of intermediate brushes (5) around their own satellite axes (12).

2. The head for washing vehicle wheels according to claim 1, wherein the transmission mechanism that transmits the rotational movement to the plurality of intermediate brushes (5) comprises intermediate cogwheels (8) that interlock with the driving centered wheel (9) and with the driven cogwheels (7).

3. The head for washing vehicle wheels, according to claim 2, wherein each of the intermediate cogwheels (8) interlocks with the driving cogwheel (9) and with two driven cogwheels (7) that transmit the rotational movement to two intermediate brushes (5) located in different concentric alignments (11a), (11b).

4. The head for washing vehicle wheels according to claim 2, wherein the transmission of the rotation from the driving cogwheel (9) to the driven cogwheels (7) increases the number of revolutions.

5. The head for washing vehicle wheels according to claim 4, wherein the intermediate cogwheels (8) have a larger diameter than the driving cogwheel (9) and the driven cogwheels (7) have a smaller diameter than the driving cogwheel (9).

6. The head for washing vehicle wheels according to claim 2, wherein the intermediate cogwheels (8) have a larger diameter than the driving cogwheel (9) and the driven cogwheels (7) have a smaller diameter than the driving cogwheel (9).

7. The head for washing vehicle wheels according to claim 1, wherein the plurality of intermediate brushes (5) are arranged in at least one concentric circumferential alignment with respect to the central axis portion (3).

8. The head for washing vehicle wheels, according to claim 1, wherein the intermediate brushes (5) are arranged in at least two different concentric circumferential alignments (11a), (11b) with respect to the central axis portion (3).

9. The head for washing vehicle wheels according to claim 1, wherein the central axis portion (3) is joined to the housing (1) by a tubular junction end (3a); wherein said tubular junction end (3a) is joined to a detachable front disc (1a) that forms part of said tubular housing (1); and wherein between the detachable front disc (1a) and the front disc (6) a chamber is created wherein the transmission mechanism is located that transmits the rotational movement to the plurality of intermediate brushes (5).

* * * * *